(12) United States Patent
Krude et al.

(10) Patent No.: US 6,896,637 B2
(45) Date of Patent: May 24, 2005

(54) DIFFERENTIAL COMPRISING INTEGRATED HOMOCINETIC JOINTS

(75) Inventors: Werner Krude, Neunkirchen-Seelscheid (DE); Heinzwilli Fuchs, Mühleip (DE)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 10/398,542

(22) PCT Filed: Mar. 16, 2002

(86) PCT No.: PCT/EP02/02942
§ 371 (c)(1),
(2), (4) Date: Apr. 8, 2003

(87) PCT Pub. No.: WO03/001083
PCT Pub. Date: Jan. 3, 2003

(65) Prior Publication Data
US 2004/0048713 A1 Mar. 11, 2004

(30) Foreign Application Priority Data
May 26, 2001 (DE) .......................... 101 25 795

(51) Int. Cl.⁷ .............................................. F16H 48/06
(52) U.S. Cl. ....................................... 475/222; 475/248
(58) Field of Search ................................ 475/222, 248, 475/230

(56) References Cited

U.S. PATENT DOCUMENTS

| | | | | |
|---|---|---|---|---|
| 1,128,429 A | * | 2/1915 | Fetzet | 475/222 |
| 2,187,843 A | | 1/1940 | Rzeppa | |
| 2,207,882 A | * | 7/1940 | Wasserman | 475/222 |
| 2,801,551 A | * | 8/1957 | Marchetti | 475/222 |
| 4,723,464 A | | 2/1988 | Welschof et al. | |
| 5,718,653 A | | 2/1998 | Showalter | |
| 5,916,055 A | | 6/1999 | Wormbaecher | |
| 6,027,423 A | * | 2/2000 | Bell | 475/230 X |
| 6,692,398 B1 | * | 2/2004 | Sullivan | 475/230 |

FOREIGN PATENT DOCUMENTS

| | | |
|---|---|---|
| FR | 41 966 | 5/1933 |
| FR | 972 511 | 1/1951 |
| GB | 312 481 | 5/1929 |

* cited by examiner

*Primary Examiner*—Ha Ho

(57) ABSTRACT

A differential drive having a drivable differential carrier 11 which is rotatably supported in a drive housing, which comprises a longitudinal carrier axis, in which two axle shaft gears 28, 29 whose axes extend co-axially relative to the longitudinal carrier axis are arranged and rotatably supported and in which a plurality of differential gears 31 whose axes extend radially relative to the longitudinal carrier axis are arranged and held so as to rotate with said differential carrier 11, wherein the axle shaft gears 28, 29 engage the differential gears 31; and having constant velocity joints 22, 23 which are positioned inside the differential carrier 11 and whose outer joint parts 26, 27 are connected to the axle shaft gears 28, 29 in a rotationally fast way, wherein, between the axle shaft gears 28, 29 in the differential carrier 11, there is arranged a spider member 30 which comprises a hub 32 whose axis extends co-axially relative to the carrier axis and which is provided with at least three bearing journals 33 which project radially from the hub 32 and on which the differential gears 31 are rotatably supported, wherein, in the differential carrier 11 in a cylindrical inner face there are provided wide longitudinal grooves which partially receive the differential gears 31.

15 Claims, 10 Drawing Sheets

DIFFERENTIAL COMPRISING INTEGRATED HOMOCINETIC JOINTS

DESCRIPTION

The invention is referred to a differential drive having a drivable differential carrier which is rotatably supported in a drive housing, which comprises a longitudinal carrier axis, in which two axle shaft gears whose axes extend co-axially relative to the longitudinal carrier axis are arranged and rotatably supported and in which a plurality of differential gears whose axes extend radially relative to the longitudinal carrier axis are arranged and held so as to rotate with said differential carrier, wherein the axle shaft gears engage the differential gears; and having constant velocity joints which are positioned inside the differential carrier and whose outer joint parts are connected to the axle shaft gears in a rotationally fast way, wherein, between the axle shaft gears in the differential carrier, there is arranged a spider member which comprises a hub whose axis extends co-axially relative to the carrier axis and which is provided with at least three bearing journals which project radially from the hub and on which the differential gears are rotatably supported.

A differential drive of said type is known from DE 198 54 215 A1. The differential gears have to have a very small diameter or, if the diameter is larger, they have to be set back towards the longitudinal carrier axis to allow their outer end faces to run freely relative to the cylindrical inner carrier face.

A differential drive with integrated constant velocity universal joints is also known from U.S. Pat. No. 2,187,843 wherein, in a first embodiment, the differential carrier is formed by a cup and a cover with an integrally formed-on ring gear. The outer joint parts are provided in the form of bevel axle shaft gears which engage bevel differential gears. According to a further embodiment, the differential carrier is undivided and there is provided a central assembly aperture through which the constant velocity joints can be inserted one after the other. The outer joint parts are designed as axle shaft gears in the form of crown gears and the differential gears as straight spur gears. In both cases, the differential gears are kept at a radial distance from one another by a spacing element and run on a journal inserted radially into bores in the differential carrier.

It is the object of the present invention to propose a differential drive of the initially mentioned type which is easy to mount and, while having a small carrier diameter, permits large differential gears. The objective is achieved by providing a differential drive wherein in the differential carrier in a cylindrical inner face, there are provided wide longitudinal grooves which partially receive the differential gear. It is particularly advantageous that the wide longitudinal grooves extend at least as far as the cover end of the differential carrier. The spider member is preferably arranged floatingly in the differential carrier. In particular, it is proposed that the outer ends of the bearing journals displaceably engage second longitudinal grooves or longitudinal slots in the differential carrier and that the outer ends of the bearing journals are provided with form-fitting flattened portions extending parallel to the longitudinal carrier axis. Furthermore, it is proposed that, in the differential carrier, in the cylindrical inner face within the wide longitudinal grooves, there are provided deepened grooves which pass through at least one flange at the differential carrier and from which there can start the second longitudinal grooves or longitudinal slots for receiving the bearing journals. Because the carrier diameter is small, as a result of which the differential drive is light in weight, it is possible to use large differential gears which results in a high torque transmitting capacity. As a result of this design, the differential gears are partially countersunk in the grooves within the curved inner face of the differential carrier. The curved inner face thus no longer forms the inner contour within which the differential gears have to be positioned, as a result of which there existed considerable limits as regards increasing the size of the differential gears. In a preferred embodiment, the differential gears are held in the radial direction by means of their end faces directly between the base of the groove and a step on the bearing journal without there being any need for further securing means.

The means as described above simplify assembly in that both the constant velocity joints and the differential gears together with the respective bearing elements can be axially inserted into the differential carrier, in particular, all parts can be inserted from one end. In a preferred embodiment, the differential carrier, for strength reasons, is designed as a cup element with a flange and a cover at one end and with a base at the other end, wherein a driving ring gear can be screwed or formed on to the flange or the cover at the same time. Because the bearing journals of the differential gears are supported in the differential carrier in an axially floating way, the differential gears automatically position themselves centrally between the axle shaft gears, so that the means for compensating for axial play, if provided at all, have to be inserted into the differential carrier at one end of same only. In particular, this can be effected after the two constant velocity joints and the differential gears have been mounted at the open end of the cup element prior to positioning and bolting on the cover.

According to a further advantageous embodiment of the differential drive in accordance with the invention, second longitudinal grooves can be produced in a cylindrical inner face of the differential carrier at an exact angular distance, but without their axial extension being specified too clearly, which second longitudinal grooves or longitudinal slots are provided to receive the bearing journals. The longitudinal slots which may be generated in the casing of the differential carrier are bridged by the flange at an axial end, so that their effect on the strength of the differential carrier is insignificant. At the same time, the longitudinal slots breaking through the differential carrier constitute the necessary oil supply apertures leading to the interior of the differential carrier.

Furthermore, it is proposed that one axle shaft gear is directly axially supported at one end of the differential carrier or at a cover of the differential carrier and that the means for compensating for axial play are inserted exclusively between the other axle shaft gear and a cover of the differential carrier. It is also proposed that the differential gears and the spider member form a captively secured pre-assembled unit in that the differential gears are secured by securing means on the bearing journals. According to a preferred embodiment it is proposed that the axle shaft gears are produced so as to be integral with the outer joint parts of the constant velocity joints. However, the outer joint parts and the axle shaft gears can also be produced separately and then subsequently welded or bolted together. According to a further advantageous embodiment, the axle shaft gears are provided in the form of crown gears and the differential gears in the form of spur gears.

Preferred embodiments of the invention are illustrated in drawings and will be described below.

Figure 1:
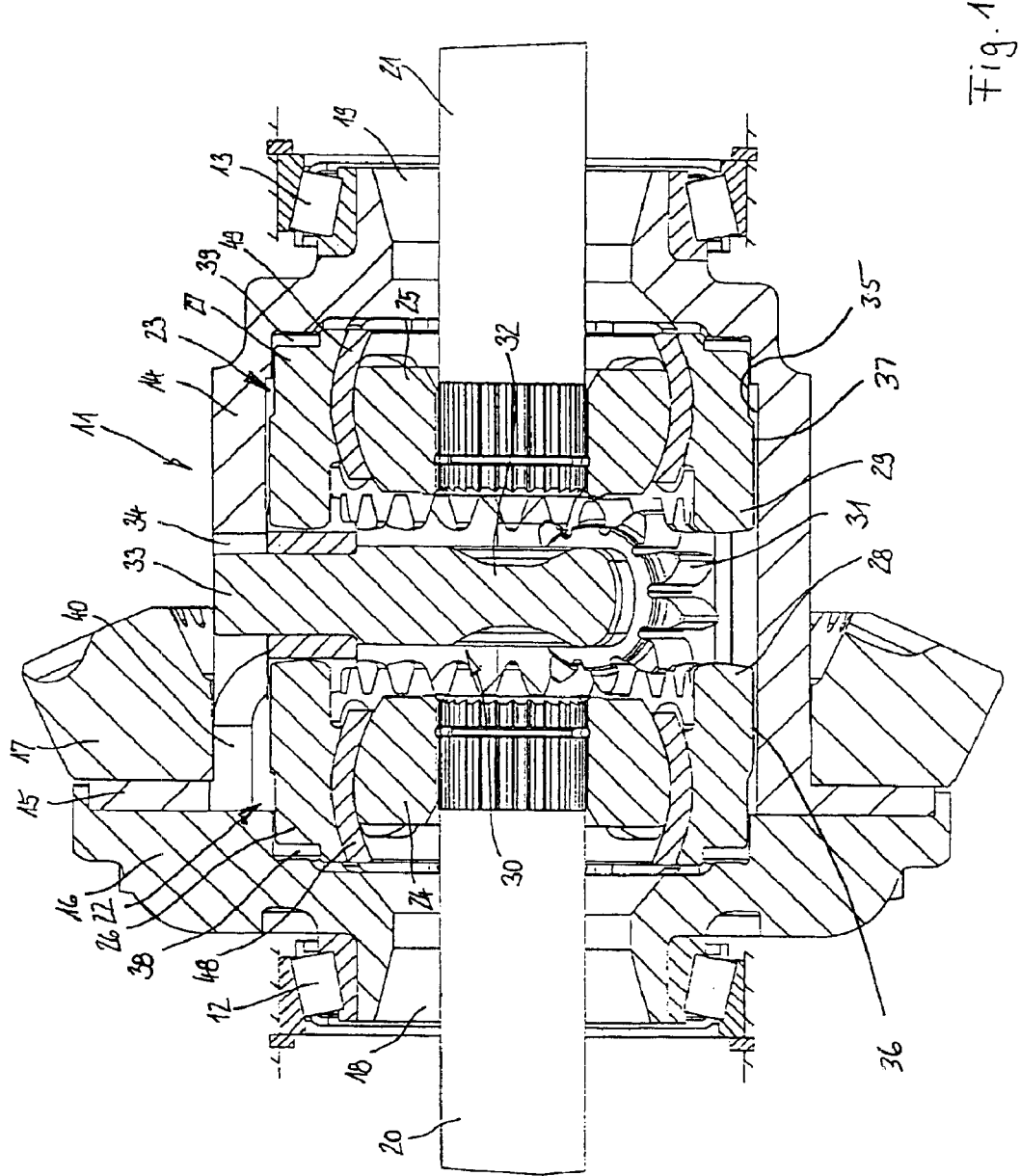
FIG. 1 is a longitudinal section through a differential carrier with integrated constant velocity joints.

FIG. 1 shows a differential carrier provided with bearings 12, 13 which support the differential carrier relative to a drive housing (not illustrated). The differential carrier 11 substantially consists of a cup-shaped housing 14 comprising a formed-on flange 15, of a cover 16 attached to the flange and of a ring gear 17 which is bolted on to the flange and which has to be made to engage a driving pinion supported in the housing (not illustrated). At both ends of the assembled differential carrier 11, there are provided apertures 18, 19 through which axle shafts 20, 21 are inserted. The latter are connected to constant velocity universal joints 22, 23 integrated into the differential carrier 11, i.e. to the inner joint parts 24, 25 thereof. Furthermore, the constant velocity universal joints comprise outer joint parts 26, 27, ball cages 48, 49 as well as torque transmitting balls (not shown) which engage the joint parts and are held in one plane by the ball carriers. The outer joint parts 26, 27 of the constant velocity universal joints are provided directly in the form of axle shaft gears 28, 29 with crown gear toothings. Said axle shaft gears 28, 29 engage differential gears 31 of which one is illustrated and which are designed as spur gears. Between the axle shaft gears 28, 29 there is positioned a spider member 30 comprising a hub 32 and bearing journals 33 projecting radially therefrom. The differential gears 31 are supported on the bearing journals 33. The bearing journals 33 engage longitudinal slots 34 in the differential carrier, so that the differential gears 31 are held with axial play between the axle shaft gears 28, 29. The outer joint parts 26, 27 are centred by centring faces 36, 37 in the cylindrical inner face 35 of the differential carrier 11. The constant velocity joints 22, 23 are axially supported in the carrier via means 38, 39 for compensating for axial play.

Figure 2:
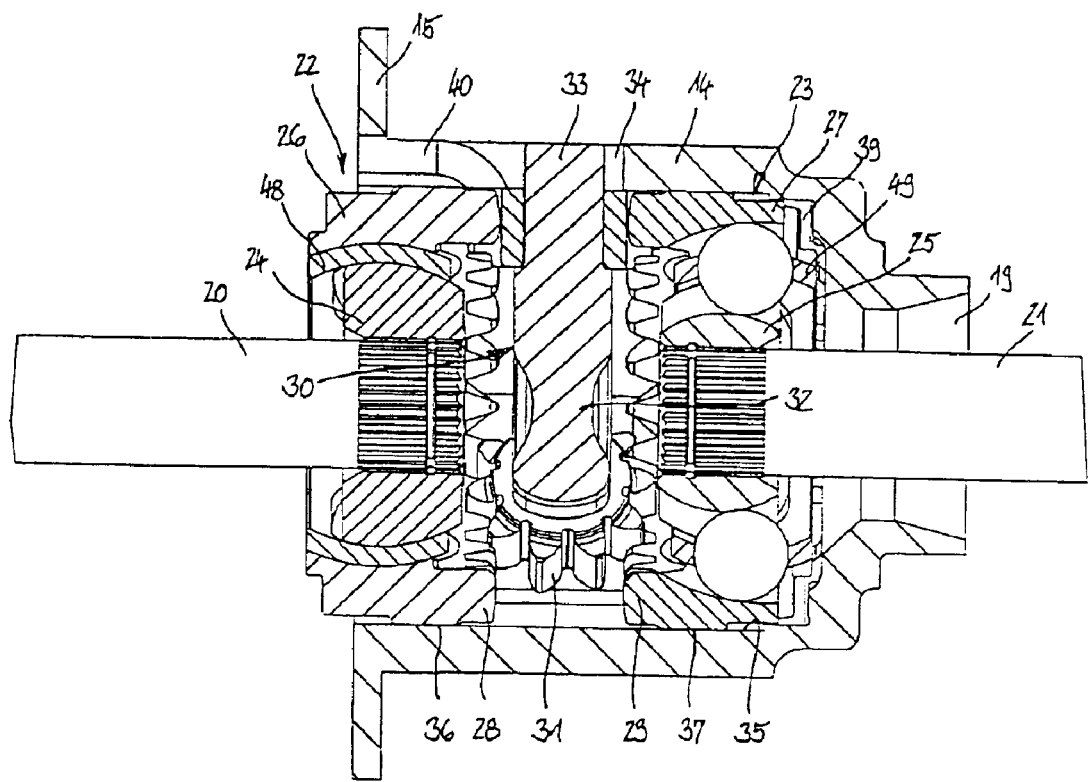
FIG. 2 shows a differential carrier which is similar to that shown in FIG. 1, but without bearing means, cover and ring gear.

FIG. 2 shows a differential carrier 11 with two constant velocity universal joints 22, 23 in a design similar to that illustrated in FIG. 1, but without a bearing, cover and ring gear. As compared to the previous embodiment, the centring faces 36, 37 of the outer joint parts 26, 27 are axially reduced. All the remaining details correspond to those shown in FIG. 1 and carry the same reference numbers. To that extent, reference is made to the description above.

Figure 3:
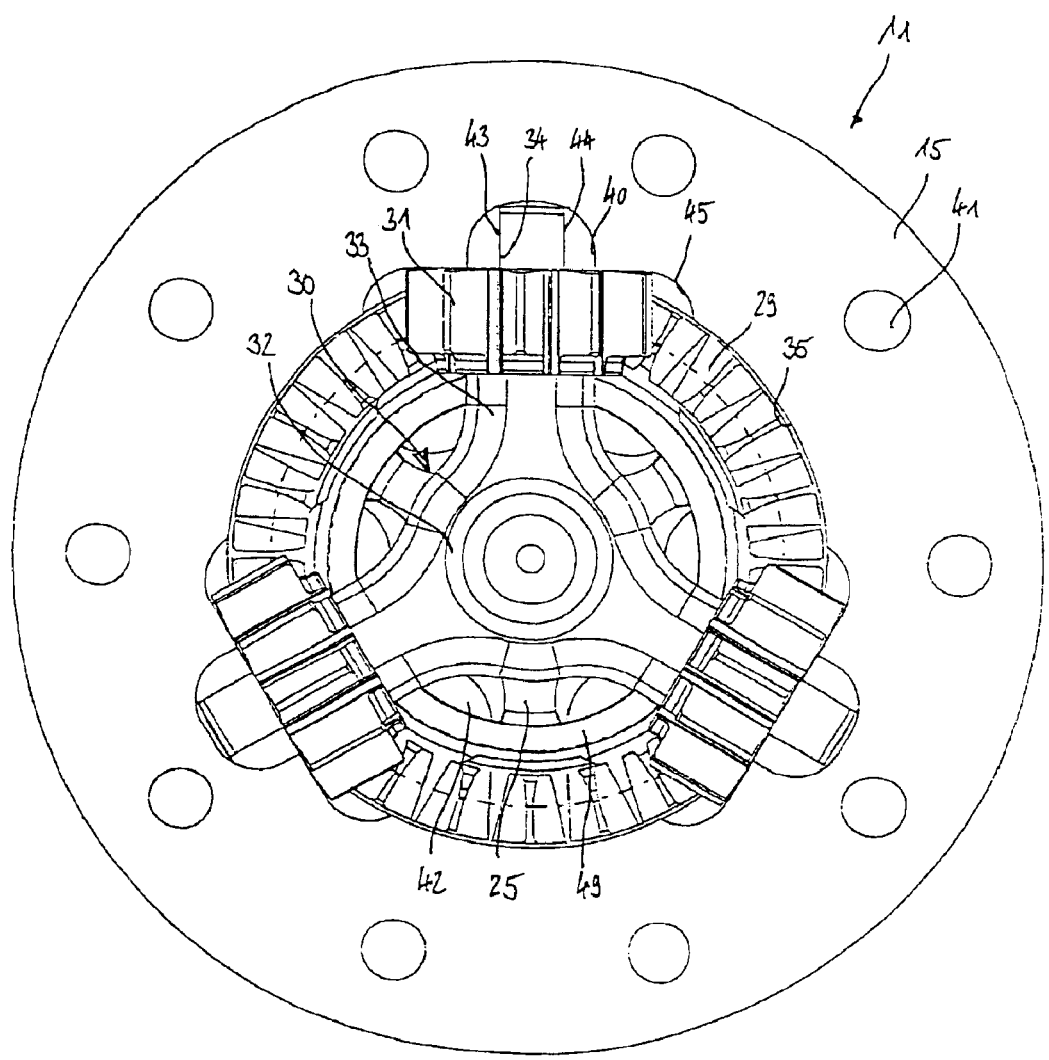
FIG. 3 shows the differential carrier according to FIG. 2 in an axial view of the flange.

FIG. 3 shows a differential carrier 11 of the above-described type in an axial view of the flange 15 of the differential carrier, with the cover 16 and the ring gear 17 and, additionally the front constant velocity joint 22 having been removed. The flange 15 can be seen to be provided with through-holes 14 for bolting on the ring gear and cover. The spider member 31 is shown to comprise a hub 32 and three symmetrically designed bearing journals 33. Between each two bearing journals 33, there can be seen torque transmitting balls 42 held in a cage 49. The differential gears 31 are positioned on the bearing journals 33. The outer ends of the bearing journals 33 comprise flattened portions 43, 44 and engage in a form-fitting way the slots 34. Furthermore, it is possible to see the narrow second grooves 40 in the differential carrier which run into the slots 34. Furthermore, the inner face 35 can be seen to comprise circumferentially distributed, wide grooves 45 which partially receive the differential gears 31. Behind the differential gears 31, there is lying the axle shaft gear 29 with its crown gear toothing, which axle shaft gear 29 is produced so as to be integral with the outer joint part of the rear constant velocity universal joint. The differential gears 31 run on the bearing journals 33 in an unsecured way and are radially outwardly supported in the grooves 45.

Figure 4:
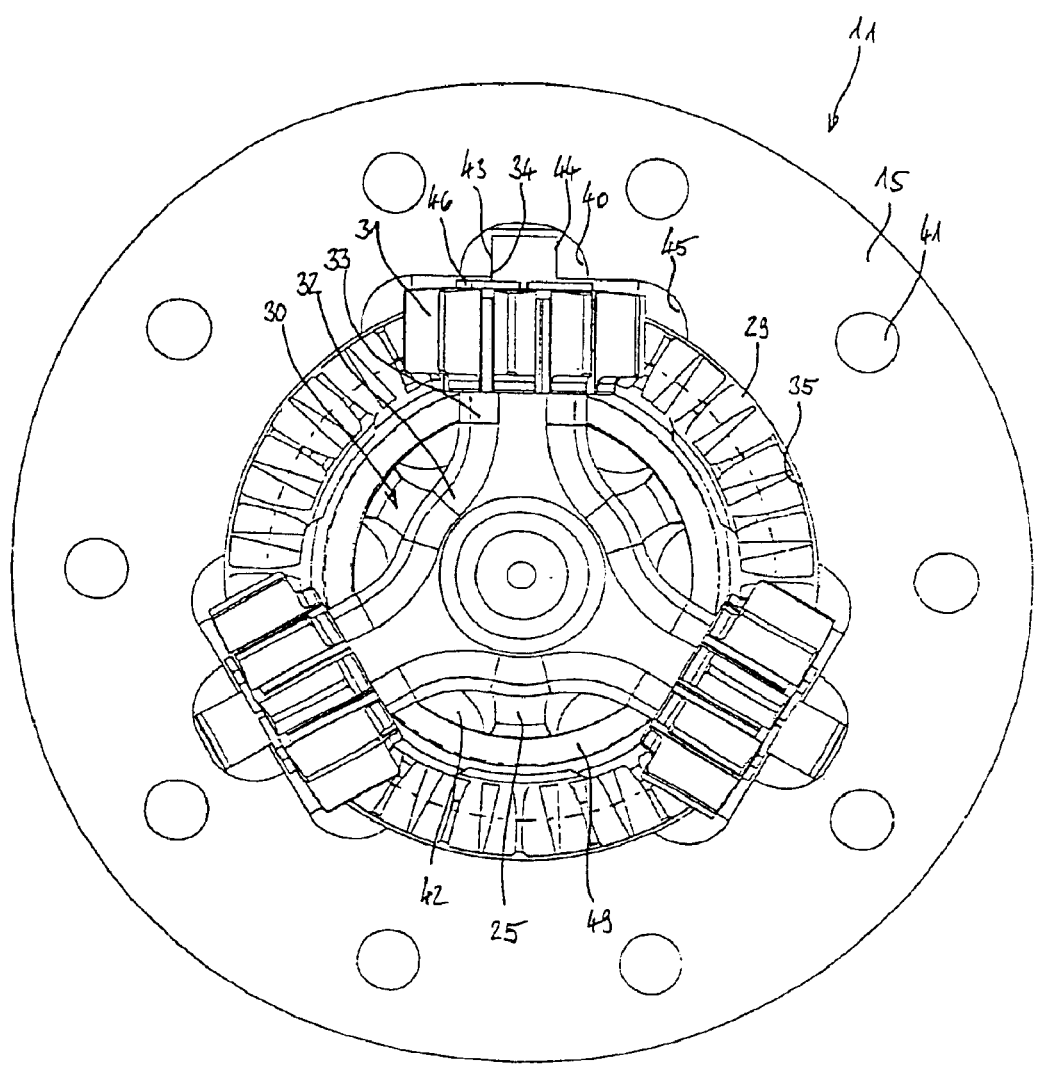
FIG. 4 shows a differential carrier which is similar to that shown in FIG. 3, in an axial view of the flange.

FIG. 4 shows a differential carrier in an axial view of the flange 15 as illustrated in FIG. 3, with the cover and ring gear and, additionally, the front constant velocity universal joint having been removed. The differential carrier shown in FIG. 4 differs from that shown in FIG. 3 in that, outside the differential gears 31, securing rings 46 have been mounted on the bearing journals 33 which are able to hold together a pre-assembled unit which consists of the spider member 30 and differential gears 31 and which, as such, is easier to handle. All remaining details correspond to those in FIG. 3 and have been given the same reference numbers. To that extent reference is made to the description of FIG. 3.

Figure 5:
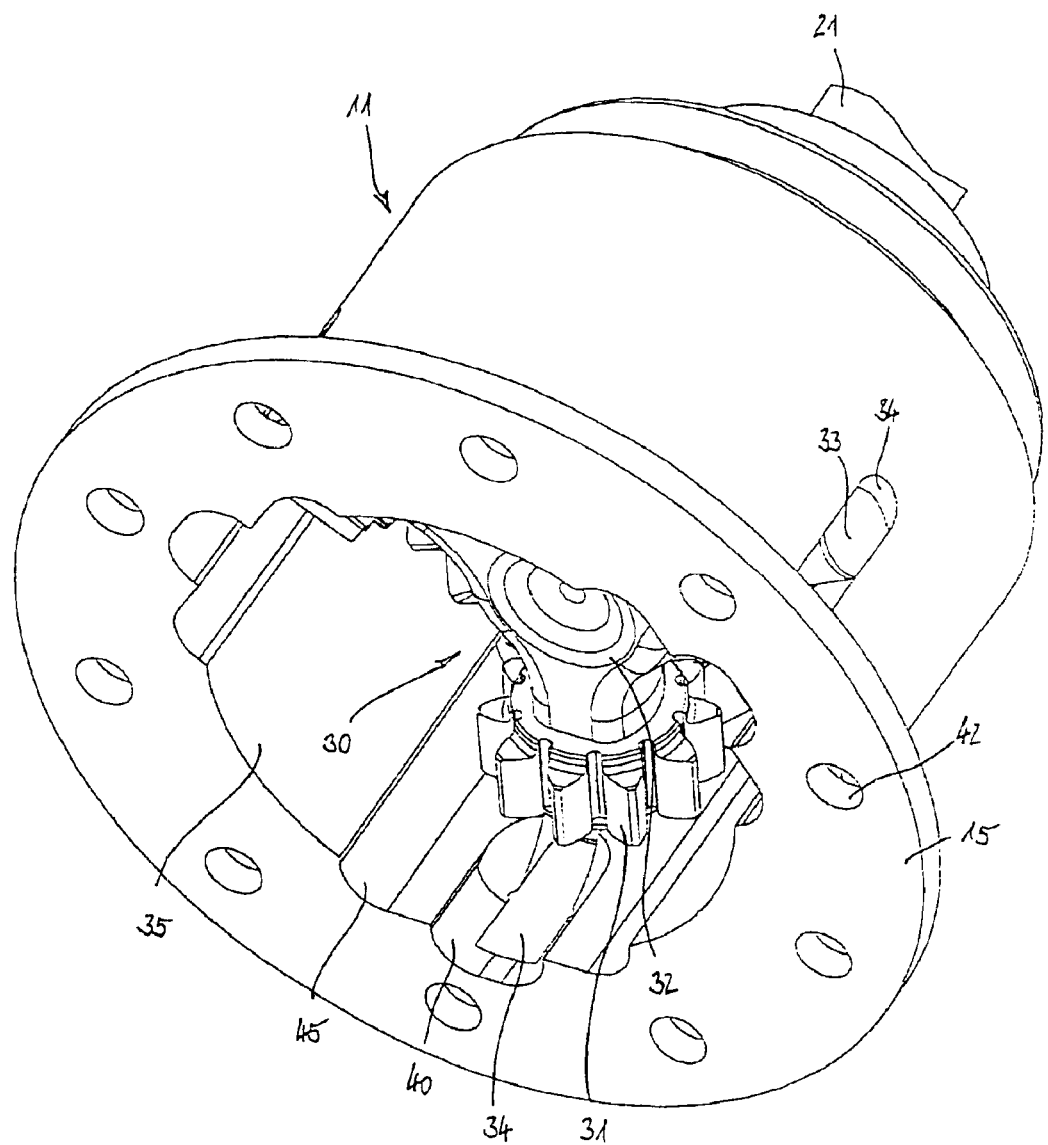
FIG. 5 shows a differential carrier according to FIGS. 3 and 4 in an inclined view.

FIG. 5, in a perspective view, shows the differential carrier in the same embodiment as illustrated in FIG. 4. It is particularly easy to see the second narrower and deeper grooves 40 as produced in the inner face 35 of the differential carrier 11; they are axially delimited, run out in the inner face 35 and are used to form the slots 34 which start directly behind the flange 15 and break through the differential carrier 11. The first wider grooves 45 for receiving the differential gears 31 can also be seen. All the remaining details have been given the same reference numbers as given in the previous Figures. To that extent reference is made to the description of same.

Figure 6:
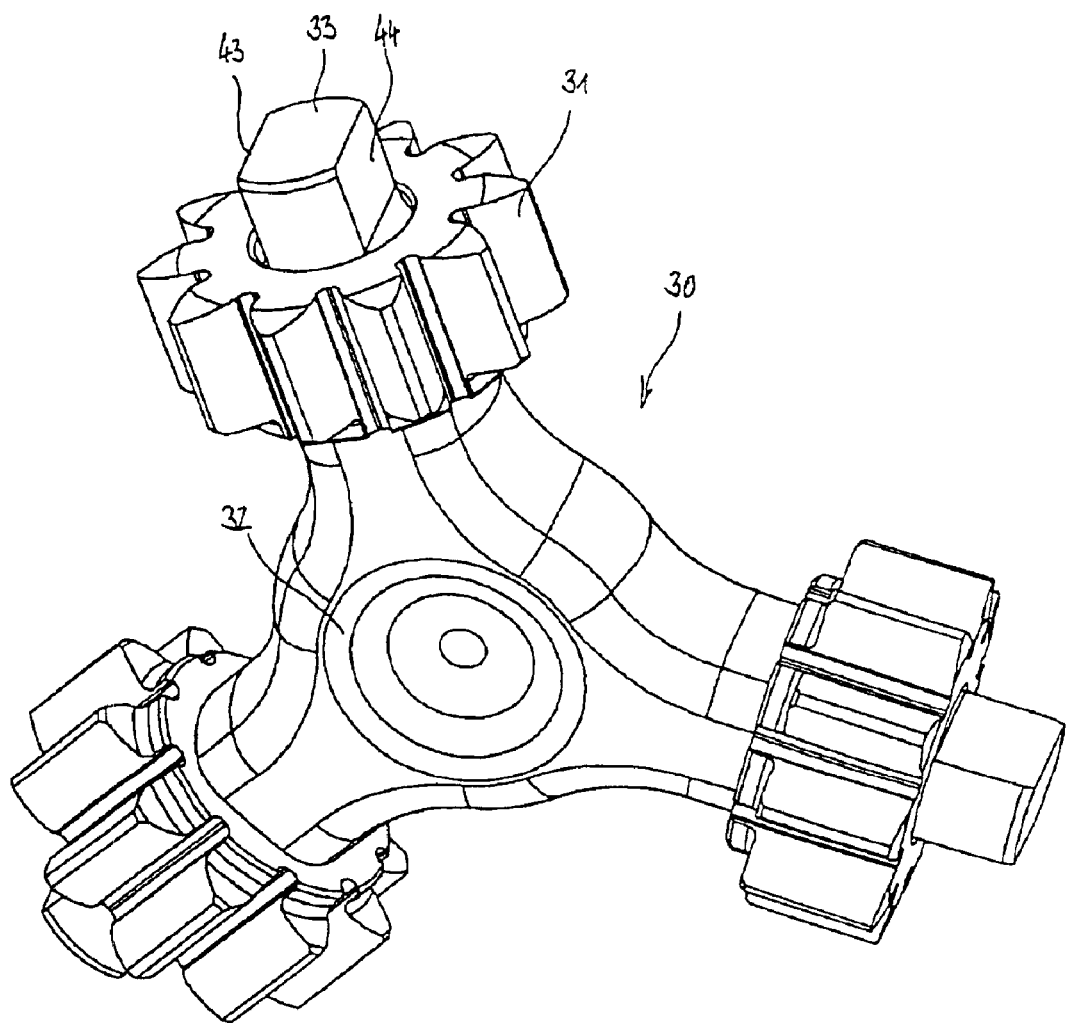
FIG. 6 shows an assembled unit consisting of the spider member and differential gears of a differential carrier according to FIGS. 1 to 3 in an inclined view.

FIG. 6 shows a cross member 30 with its details and the slid-on differential gears 31 in the embodiment as illustrated in FIG. 3, i.e. the differential gears are axially unsecured on the bearing journal 33. The details of the spider member have the same reference numbers as in the preceding figures. To that extent, reference is made to the description of same.

Figure 7:
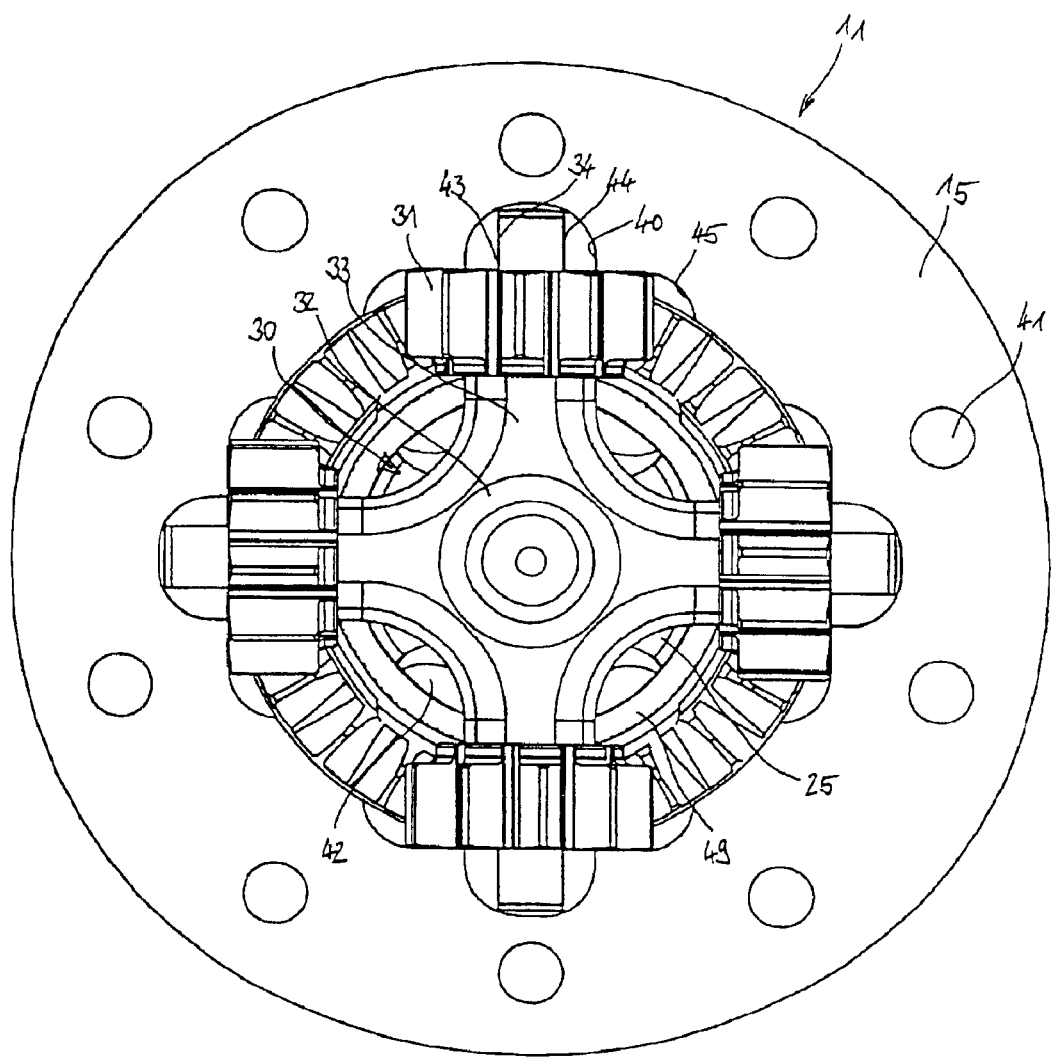
FIG. 7 shows a differential carrier in a modified embodiment with four differential gears, with the cover having been removed, in a axial view of the flange.

FIG. 7 shows a differential carrier in a second embodiment in an axial view of the flange 15, with the cover and ring gear and, additionally, the front constant velocity joint having been removed. The embodiment to FIG. 7 deviates from the previous embodiments in that the bearing journals 33 of the spider member 30 are spaced at an angle of 90° and comprise four differential gears 31. In accordance with the number of differential gears 31 there are provided four slots 34, four narrow grooves 40 and four wide grooves 45 in the differential carrier 11. All the remaining details correspond to those mentioned in connection with the preceding embodiment. To that extent, reference is made to the description of same.

Figure 8:
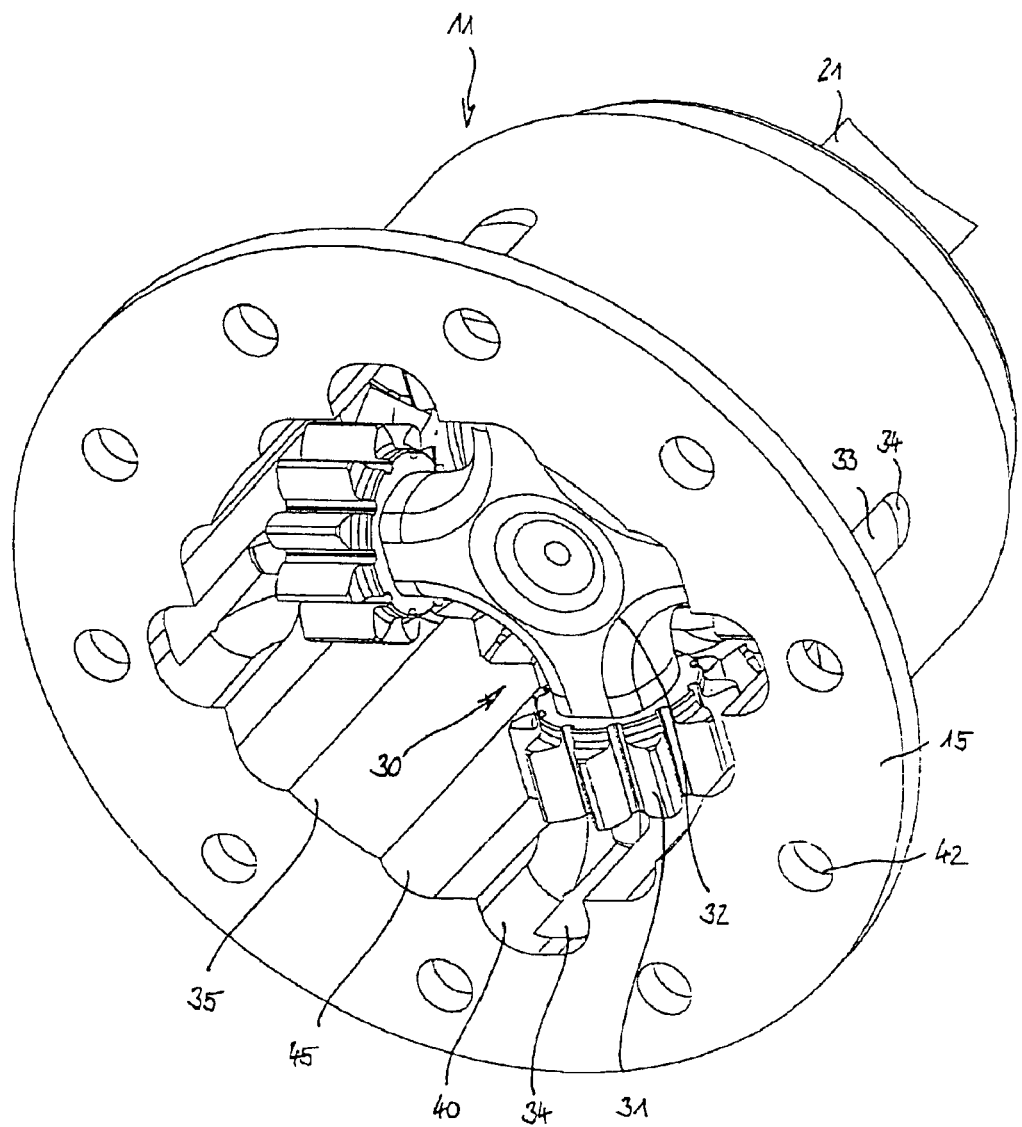
FIG. 8 shows the differential carrier according to FIG. 7 in an inclined view.

FIG. 8 shows the differential carrier in the embodiment according to FIG. 7 in a perspective view. Here, too, it is easy to see how the second narrow and deeper grooves 40 are produced in the inner face 35 of the differential carrier 11; they are axially delimited, run out in the inner face 35 and are made to form the slots 34 which begin directly behind the flange 15 and break through the differential carrier 11. Furthermore, it is possible to see the first wider grooves 46 for receiving the differential gears 31. All the remaining details have been given the same reference numbers as in the preceding figures. To that extent, reference is made to the description of same.

Figure 9:
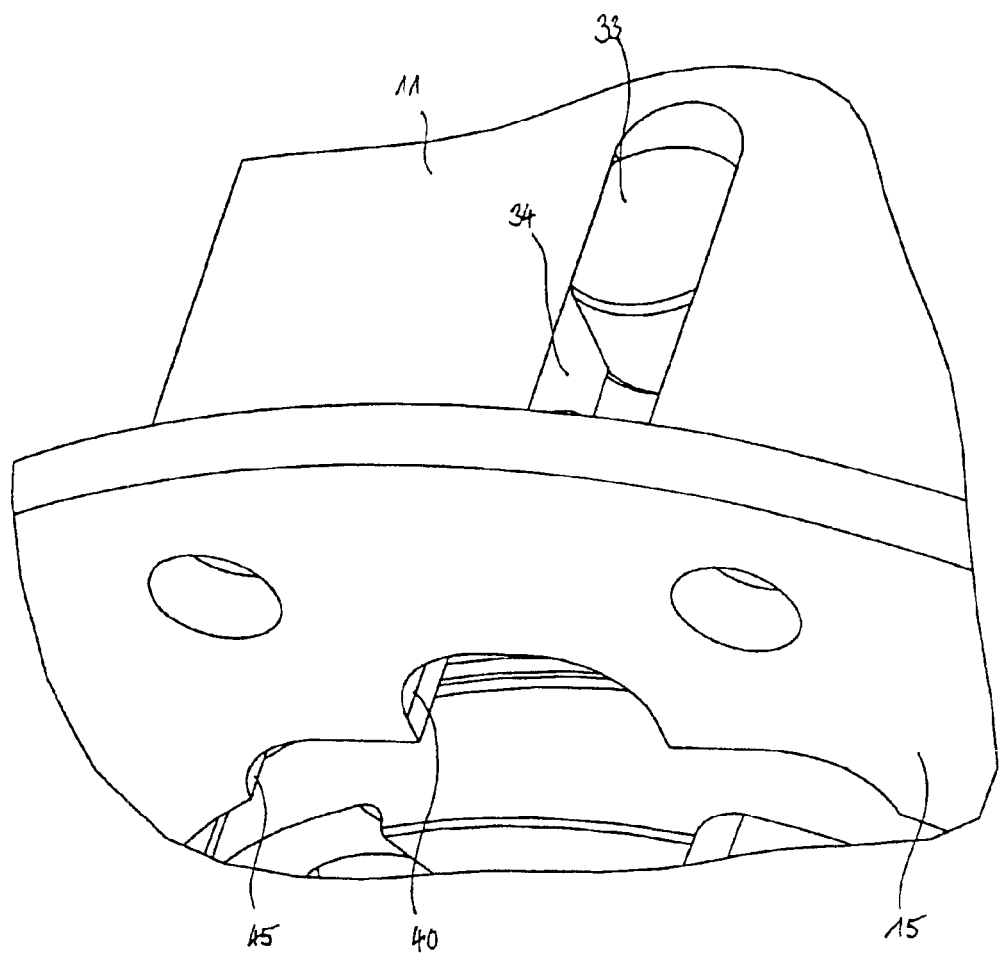
FIG. 9 shows an enlarged detail of a differential carrier according to FIG. 5 or 8 in an inclined view of the flange from the cover end.
Figure 10:
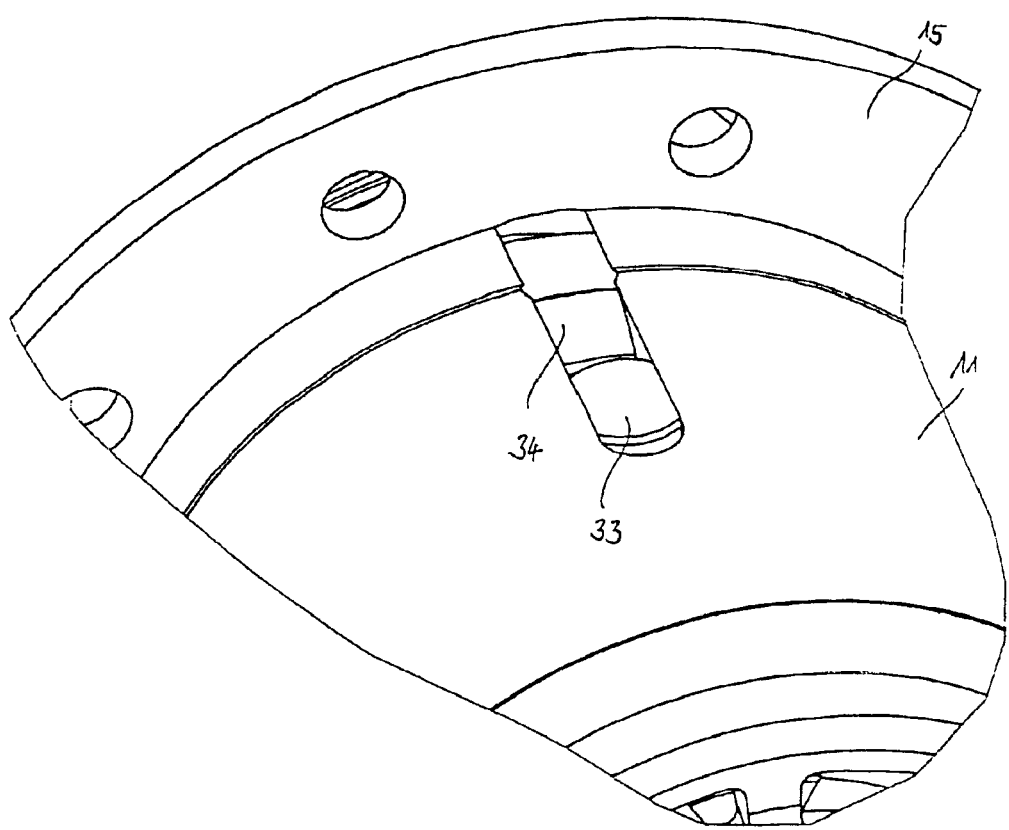
FIG. 10 shows an enlarged detail of a differential carrier according to FIG. 5 or 8 in an inclined view of the flange from the reverse side.

FIGS. 9 and 10 which will be described jointly below again show in great detail the shape of the outer ends of the bearing journals 33 and of the slots 34 which are bridged by the flange 15 at their respective free end. Said details have been given the same reference numbers as above. The that extent reference is made to the preceding description.

What is claimed is:

1. A differential drive having a drivable differential carrier (11) which is rotatably supported in a drive housing, the drive comprising:

two rotatably supported axle shaft gears (28, 29) whose axes extend co-axially relative to a longitudinal carrier axis;

a plurality of differential gears (31) whose axes extend radially relative to the longitudinal carrier axis and which are arranged and held so as to rotate with said differential carrier (11), and wherein the axle shaft gears (28, 29) engage the differential gears (31);

constant velocity joints (22, 23) which are positioned inside the differential carrier (11) and whose outer joint parts (26, 27) are connected to the axle shaft gears (28, 29) in a rotationally fast way; and a spider member (30) between the axle shaft gears (28, 29) in the differential carrier (11), which comprises a hub (32) whose axis extends co-axially relative to the carrier axis and at least three bearing journals (33) which project radially from the hub (32) and rotatably support the differential gears (31)

wherein the differential carrier (11) comprises a unitary cup-shaped housing defining a cylindrical inner face (35), the inner face (35) having wide longitudinal grooves (45) which partially receive the differential gears (31), wherein outer ends of the bearing journals (33) engage, from the inside, second longitudinal grooves (34) in the differential carrier (11) and wherein the differential carrier (11) comprises deepened grooves (40) in the cylindrical inner face (35) within the wide longitudinal grooves (45) which pass through at least one flange (15) at the differential carrier (11) and from which there start the second longitudinal grooves (34) for receiving the bearing journals (33).

2. A differential drive according to claim 1, wherein the wide longitudinal grooves (45) extend at least as far as a cover end of the differential carrier (11).

3. A differential drive according to claim 1, wherein the spider member (30) is arranged in the differential carrier (11) so as to be axially floating.

4. A differential drive according to claim 2, wherein the spider member (30) is arranged in the differential carrier (11) so as to be axially floating.

5. A differential drive according to claim 1, wherein the outer ends of the bearing journals (33) include flattened portions (43, 44) which extend parallel to the longitudinal carrier axis.

6. A differential drive according to claim 1, wherein one of the axle shaft gears (29) is axially directly supported on one end of the differential carrier (11) or on a cover of the differential carrier (11) and wherein means for compensating for axial play (38) are inserted only between the other one of the axle shaft gears (28) and a cover (16) of the differential carrier (11).

7. A differential drive according to claim 3, wherein one of the axle shaft gears (29) is axially directly supported on one end of the differential carrier (11) or on a cover of the differential carrier (11) and wherein means for compensating for axial play (38) are inserted only between the other one of the axle shaft gears (28) and a cover (16) of the differential carrier (11).

8. A differential drive according to claim 5, wherein one of the axle shaft gears (29) is axially directly supported on one end of the differential carrier (11) or on a cover of the differential carrier (11) and wherein means for compensating for axial play (38) are inserted only between the other one of the axle shaft gears (28) and a cover (16) of the differential carrier (11).

9. A differential drive according to claim 1, wherein the differential gears (31) and the spider member (30) form a pre-assembled unit which is captively secured and wherein the differential gears (31) are secured on the bearing journals (33) by a securing mechanism (46).

10. A differential drive according to claim 3, wherein the differential gears (31) and the spider member (30) form a pro-assembled unit which is captively secured and wherein the differential gears (31) are secured on the bearing journals (33) by a securing mechanism (46).

11. A differential drive according to claim 5, wherein the differential gears (31) and the spider member (30) form a pre-assembled unit which is captively secured and wherein the differential gears (31) are secured on the bearing journals (33) by a securing mechanism (46).

12. A differential drive according to claim 6, wherein the differential gears (31) and the spider member (30) form a pre-assembled unit which is captively secured and wherein the differential gears (31) are secured on the bearing Journals (33) by a securing mechanism (46).

13. A differential drive according to claim 1, wherein the axle shaft gears (28, 29) are formed integrally with the outer joint parts (26,27) of the constant velocity joints (22, 23).

14. A differential drive according to claim 1, wherein the axle shaft gears (28,29) are crown gears and the differential gears (31) are spur gears.

15. A differential drive according to claim 13, wherein the axle shaft gears (28, 29) are crown gears and the differential gears (31) are spur gears.

* * * * *